(12) United States Patent
Kerselaers et al.

(10) Patent No.: US 11,696,237 B2
(45) Date of Patent: Jul. 4, 2023

(54) NEAR-FIELD COMMUNICATION DEVICE WITH VARIABLE PATH-LOSS

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 319 days.

(21) Appl. No.: 17/026,416

(22) Filed: Sep. 21, 2020

(65) Prior Publication Data

US 2022/0095239 A1    Mar. 24, 2022

(51) Int. Cl.
| | |
|---|---|
| *H04L 5/00* | (2006.01) |
| *H04W 52/24* | (2009.01) |
| *H04W 4/80* | (2018.01) |
| *H04W 52/02* | (2009.01) |

(52) U.S. Cl.
CPC .......... *H04W 52/242* (2013.01); *H04W 4/80* (2018.02); *H04W 52/0245* (2013.01)

(58) Field of Classification Search
CPC .. H04W 52/242; H04W 4/80; H04W 52/0245
USPC ....................................................... 370/329
See application file for complete search history.

(56) References Cited

U.S. PATENT DOCUMENTS

| | | |
|---|---|---|
| 9,906,263 B2 | 2/2018 | Stucki et al. |
| 10,112,556 B2 | 10/2018 | Buttolo et al. |
| 2007/0236336 A1 * | 10/2007 | Borcherding ........ G06K 7/0008 340/572.1 |
| 2014/0127993 A1 * | 5/2014 | Frankland .......... G06K 19/0726 455/41.1 |
| 2019/0059645 A1 * | 2/2019 | Nelson .................. A47J 37/044 |

FOREIGN PATENT DOCUMENTS

| | | | | |
|---|---|---|---|---|
| EP | 2342796 A2 | * | 7/2011 | .............. H02J 17/00 |
| EP | 3664253 A1 | * | 6/2020 | .............. H02J 50/10 |
| EP | 3 664 253 A1 | | 10/2020 | |
| EP | 3813386 A1 | * | 4/2021 | ........... H04R 25/505 |
| WO | 2010/033727 A2 | | 3/2010 | |
| WO | WO-2010070463 A1 | * | 6/2010 | ............... A61B 5/16 |
| WO | WO-2010120164 A1 | * | 10/2010 | ............... H01Q 1/38 |

* cited by examiner

*Primary Examiner* — Christopher M Crutchfield
*Assistant Examiner* — Jean F Voltaire

(57) ABSTRACT

One example discloses a first near-field device, including: a near-field antenna; a tuning circuit; a communications unit coupled to the near-field antenna and tuning circuit; a controller coupled to the tuning circuit and the communications unit; wherein the first near-field device is configured to have a near-field communications channel path-loss with respect to a second near-field device; wherein the controller is configured to set the path-loss to a first channel path-loss before contact detected between the first and second near-field devices; wherein the controller is configured to set the path-loss to a second channel path-loss after contact detected between the first and second near-field devices; and wherein the first path-loss is greater than the second path-loss.

19 Claims, 5 Drawing Sheets

NEAR-FIELD COMMUNICATION DEVICE WITH VARIABLE PATH-LOSS

The present specification relates to systems, methods, apparatuses, devices, articles of manufacture and instructions for a near-field communications device.

SUMMARY

According to an example embodiment, a first near-field device, comprising: a near-field antenna; a tuning circuit; a communications unit coupled to the near-field antenna and tuning circuit; a controller coupled to the tuning circuit and the communications unit; wherein the first near-field device is configured to have a near-field communications channel path-loss with respect to a second near-field device; wherein the controller is configured to set the path-loss to a first channel path-loss before contact detected between the first and second near-field devices; wherein the controller is configured to set the path-loss to a second channel path-loss after contact detected between the first and second near-field devices; and wherein the first path-loss is greater than the second path-loss.

In another example embodiment, the first channel path-loss enables the first near-field device to detect contact between the first and second near-field devices.

In another example embodiment, the first channel path-loss blocks data transfer between the first and second devices; and the second channel path-loss enables data transfer between the first and second devices.

In another example embodiment, the controller is configured to set an impedance of the near-field device to a first impedance and a second impedance; to set the first channel path-loss, the controller is configured to set the impedance to the first impedance; and to set the second channel path-loss, the controller is configured to set the impedance to the second impedance.

In another example embodiment, the first impedance is greater than the second impedance.

In another example embodiment, the controller is configured to set a power level of the near-field device to a first power level and a second power level; to set the first channel field strength, the controller is configured to set the power level to the first power level; and to set the second channel field strength, the controller is configured to set the power level to the second power level.

In another example embodiment, the first power level is less than the second power level.

In another example embodiment, the controller is configured to set a center frequency of the near-field antenna to a first center frequency and a second center frequency; to set the first channel path-loss, the controller is configured to command the tuning circuit to set the near-field antenna to the first center frequency; and to set the second channel path-loss, the controller is configured to command the tuning circuit to set the near-field antenna to the second center frequency.

In another example embodiment, the second center frequency is greater than the first center frequency.

In another example embodiment, the center frequency is a resonant center frequency.

In another example embodiment, the tuning circuit is configured to change the center frequency in response to a command from the controller to change a capacitive tuning parameter in the tuning circuit.

In another example embodiment, a first frequency band is defined by the first center frequency and a second frequency band is defined by the second center frequency; and the controller is configured to adapt the first and second center frequencies to changes in resonance frequency and bandwidth due to electromagnetic loading within each of the first and second frequency bands.

In another example embodiment, the controller is configured to set a bandwidth of the near-field antenna to a first bandwidth and a second bandwidth; to set the first channel path-loss, the controller is configured to command the tuning circuit to set the near-field antenna to the first bandwidth; and to set the second channel path-loss, the controller is configured to command the tuning circuit to set the near-field antenna to the second bandwidth.

In another example embodiment, the second bandwidth is narrower than the first bandwidth.

In another example embodiment, the tuning circuit is configured to change the bandwidth in response to a command from the controller to change a resistive tuning parameter in the tuning circuit.

In another example embodiment, further comprising a contact detector circuit; wherein the contact detector circuit is configured to output a contact detected signal in response to a change in a parameter of the tuning circuit; and wherein the parameter is based on a capacitive and/or resistive tuning parameter configured to maintain a center frequency and/or bandwidth of the near-field device.

In another example embodiment, further comprising a contact detector circuit; and wherein the contact detector circuit is configured to output a contact detected signal in response to a change in a near-field communications signal voltage between the communications unit and the tuning circuit.

In another example embodiment, further comprising a contact detector circuit; wherein the contact detector circuit is configured to output a contact detected signal in response to actual physical contact between the first near-field device and the second near-field device.

In another example embodiment, further comprising a contact detector circuit; wherein the contact detector circuit is configured to output a contact detected signal in response to a predefined threshold distance between the first near-field device and the second near-field device.

In another example embodiment, the near-field antenna includes, an H-field antenna configured to receive a non-propagating quasi-static magnetic near-field signal; and an E-field antenna is configured to receive a non-propagating quasi-static electric near-field signal from the conductive structure; and a conductive surface of the near-field antenna is configured to be coupled to an on-body surface by the non-propagating quasi-static near-field electric-induction signals.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
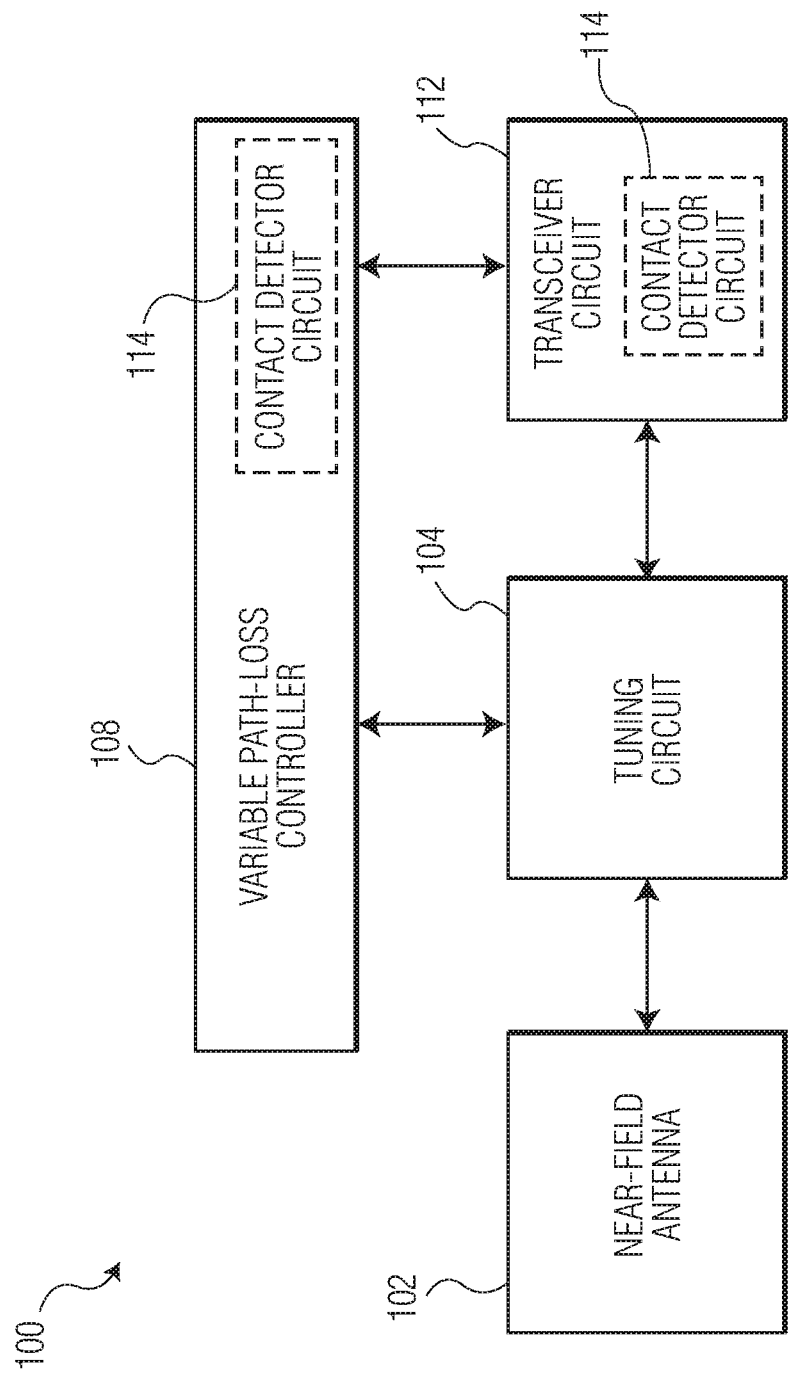
FIG. 1 is an example of a near-field wireless device with variable channel path-loss.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between one or more near-field devices on a user's body or the body of a conductive surface (i.e. on-body devices), and other conductive surfaces and/or other wireless devices (i.e. off-body devices) based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

In various example embodiments, a first near-field antenna includes a near-field electric-induction antenna (e.g. such as either a NFEI or NFEMI antenna) and is configured for on-body communications. A second near-field antenna includes a near-field magnetic-induction antenna (e.g. such as an NFC antenna) and is configured for off-body communications.

For example, an on-body sensor in the first near-field wireless device can be configured to communicate the sensor's readings to a second on-body near-field wireless device that collects the sensor's readings and perhaps other user information as well. A third off-body wireless device could be a smartphone/NFC reader that energizes the second on-body near-field wireless device that collected the sensor's readings, and thereby prompts the second on-body near-field wireless device to transmit the collected the sensor's readings to the smartphone/NFC reader.

Note, while example embodiments discussed herein refer to a user's body, on-body and off-body, in alternate embodiments the near-field device, body is herein broadly defined to include at least: a human's body, an animal's body, a body of a living organism, a body structure of an inanimate object, a robot, a vehicle, a docking system, a physical coupling system, a station on an assembly line, and so on.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

When near-field antennas are proximate to a conductive body (e.g. a person, an object, etc.) the magnetic and electric near-field signals will be substantially confined to the body and not significantly radiate in free-space. This enhances security and privacy of such body networked.

Various robust near-field communications systems use a frequency band around 10-13 MHz, and have a communication area around the body can vary between 30 cm and 1 meter depending on the antenna and power used for transmission. However, for example embodiments where such communications are preferably blocked until triggered, perhaps by detecting physical contact between two or more near-field device users, such robust near-field communications can already start before the defined trigger condition (e.g. physical contact has been made).

Now discussed is a near-field device having variable channel path-loss that prevents data communications between a first and second device user until a trigger condition such as physical contact is met, after which there is an exchange of data using near-field communication.

In some example applications, the near-field devices are intended to host communications between two or more users (e.g. that are involved in the same application like for example playing the same game together); however nearby and within normal near-field communications range can be a third user or even a much larger group of users. Without a way to distinguish the users the near-field devices would not know which other near-field device to communicate data with.

Example embodiments of the variable channel path-loss near-field devices enable two users to communicate amongst an potential crowd of other users.

FIG. 1 is an example of a near-field wireless device 100 with variable channel path-loss. The example near-field wireless device 100 includes a near-field antenna 102, a tuning circuit 104 (e.g. an antenna tuning unit (ATU)), a transceiver circuit 112 (e.g. communications unit), a variable channel path-loss controller 108, and a contact detector circuit 114.

An example embodiment of the near-field antenna 102 is discussed below in FIG. 2A.

The tuning circuit 104 is configured to adjust the device's 100 resonance frequency using a capacitive bank (C-bank), and bandwidth using a resistive bank (R-bank) in response to signals from the controller 108. The C-bank and R-bank discretes are in some examples about 130 pF and 5000 ohms respectively to support the required resonance frequency (e.g. 10.6 MHz) and bandwidth (e.g. 400 KHz). The controller 108 is configured to adjust (e.g. increment/decrement) the C-bank and R-bank values using the tuning circuit 104.

In some example embodiments, the transceiver circuit 112 is configured to inject test signals (e.g. three test signals) into the tuning circuit 104 and the antenna 102. The controller 108 is then configured to: first, monitor a loading of the near-field antenna 102, and adjust the tuning parameters if the loading is different from a preselected loading.

The transceiver circuit 112 in various example embodiments includes at least one of: a low noise amplifier (LNA) in a receiver circuit, a transmission power amplifier (PA) in a transmitter circuit, and/or measuring circuitry able to measure various signals (e.g. voltages) exchanged with the at the tuning circuit 104 and the near-field antenna 102.

The transceiver circuit 112 may also include at least one of: a frequency convertor (e.g. up/down converter), a baseband unit, and a communications data processor. The transceiver circuit 112 can be coupled to a user interface (not shown).

An example embodiment of a circuit hosting the near-field antenna 102, the tuning circuit 104, and the transceiver circuit 112 is discussed below in FIG. 2B.

The variable channel path-loss controller 108 configures the device 100 into a first state having a first channel path-loss (e.g. at startup and/or in response to an internally or externally generated reset signal). In the first path-loss state, the device 100 has a first channel path-loss that prevents normal near-field communications between two or more users, but that is also configured to respond to a trigger condition such as physical contact between two users having near-field devices.

The trigger condition, such as actual physical contact between a pair of users, or a predefined threshold distance (e.g. within 5 cm) between a pair of users, is detected by the contact detector circuit 114.

which may reside wholly in the controller 108, in the transceiver circuit 112, or be distributed between the them 108, 112. The contact detector circuit 114 outputs a contact detected signal.

The controller 108 configures the device 100 into a second state having a second channel path-loss in response to the trigger condition such as physical contact between one or more pairs of users. The second channel path-loss is lower than the first channel path-loss and thus enables normal near-field communications between the two users.

In some example embodiments, the controller 108 detects a physical contact trigger condition by monitoring the C-bank and R-bank values in the tuning circuit 104 required to maintain a center frequency and/or bandwidth of the near-field device 100 stable both before, during and after physical contact.

The controller 108 is configured to vary a channel path-loss with other near-field devices, by adjusting the device's 100 insertion loss, operational resonance frequency and operational bandwidth/quality factor of the near-field signals (e.g. NFEI or NFEMI) carried by the near-field antenna.

The controller 108 in some example embodiments is configured to vary the channel path-loss by commanding the transceiver circuit 112 to insert or remove one or more impedances (e.g. vary a data communications channel insertion loss). In some example embodiments the controller 108 is configured to set an impedance of the near-field device 100 to a first impedance and a second impedance. For the first channel path-loss, the controller 108 is configured to set the impedance to the first impedance. For the second channel path-loss, the controller 108 is configured to set the impedance to the second impedance. The first impedance is greater than the second impedance.

The controller 108 can also be configured to vary the channel field strength by commanding the near-field device 100 to operate at two or more power levels (e.g. a standby mode, and an operational mode).

The controller 108 may also be configured to vary the channel path-loss by perhaps commanding the tuning circuit 104 to adjust a set of tuning parameters if either the operational resonance frequency is different from a preselected resonance frequency and/or the operational bandwidth is different from a preselected bandwidth.

Thus in some example embodiments, the controller 108 is configured to set a center frequency of the near-field antenna to a first center frequency and a second center frequency. For the first channel path-loss, the controller 108 is configured to command the tuning circuit 104 to set the near-field antenna 102 to the first center frequency. For the second channel path-loss, the controller 108 is configured to command the tuning circuit 104 to set the near-field antenna 102 to the second center frequency.

Figure 3:
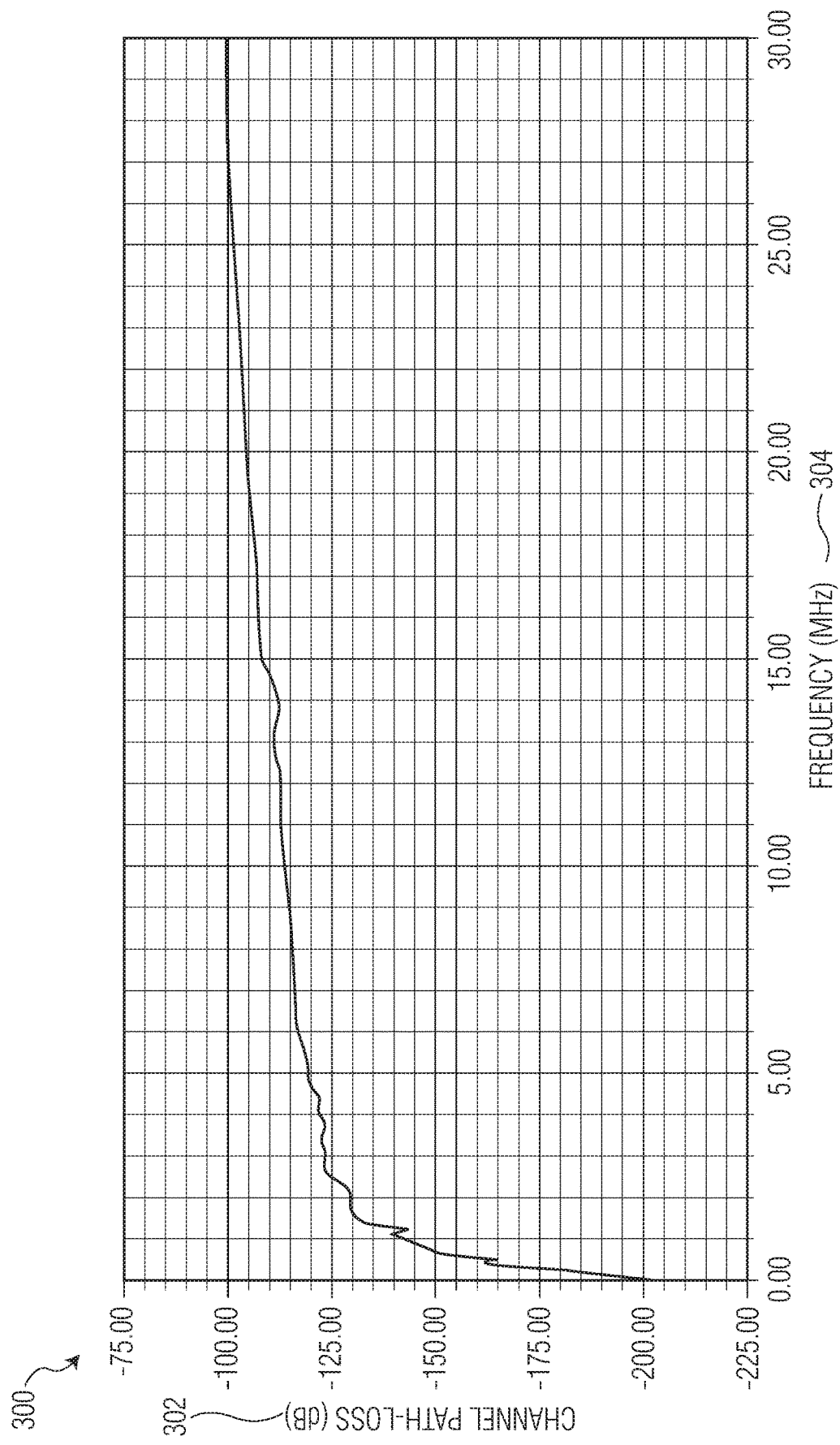
FIG. 3 is an example near-field channel path-loss.

The second center frequency is greater than the first center frequency for reasons that are explained in FIG. 3. The center frequency can be a resonant center frequency varied in response to a command from the controller 108 to change a capacitive tuning parameter in the tuning circuit 104. In some example embodiments the tuning circuit 104 set for dual band resonance with the near-field antenna 102 and is able to adapt the near-field antenna 102 for small changes in resonance frequency and bandwidth due to electromagnetic loading within each frequency band.

In other example embodiments, the controller 108 is configured to set a bandwidth of the near-field antenna to a first bandwidth and a second bandwidth. For the first channel path-loss, the controller 108 is configured to command the tuning circuit 104 to set the near-field antenna 102 to the first bandwidth. For the second channel path-loss, the controller 108 is configured to command the tuning circuit 104 to set the near-field antenna 102 to the second bandwidth.

In some example embodiments the second bandwidth is narrower than the first bandwidth, where the narrower bandwidth results in a higher quality-factor and a stronger near-field communications signal, whereas a wider bandwidth would result in a lower quality-factor and a weaker near-field communications signal. The tuning circuit 104 is configured to change the bandwidth in response to a command from the controller 108 to change a resistive tuning parameter.

Figure 2A:
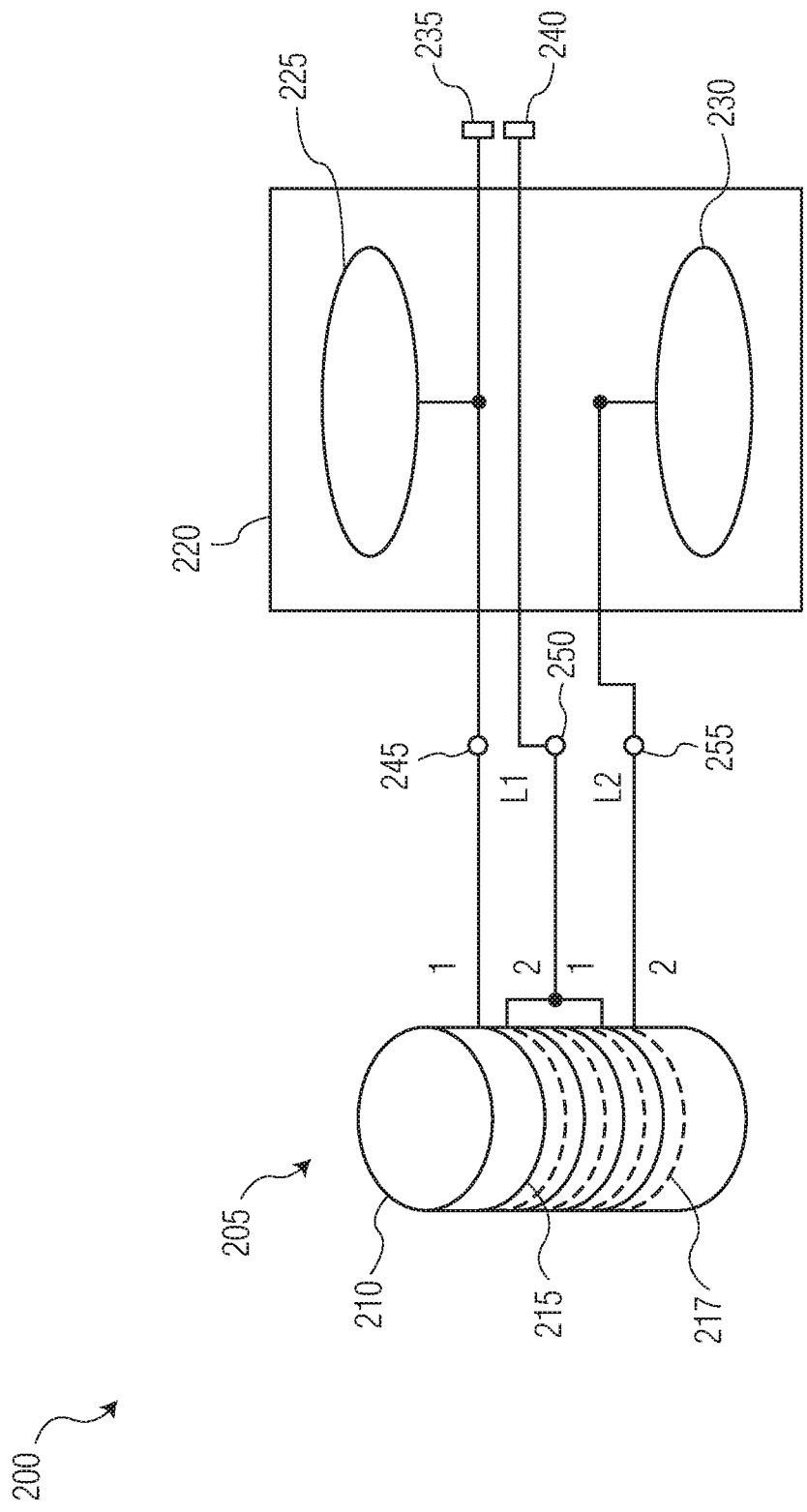
FIG. 2A is an example near-field antenna architecture.

FIG. 2A is a first example near-field antenna architecture 200. The antenna 200 includes a short loaded dipole portion 220 with two conductive loading plates 225, 230 and a small loop antenna 205.

The small loop antenna includes at least two coupled coils 215 and 217. The first coil 215 has an inductance of L1, and the second coil 217 has an inductance of L2. Both coils 215 and 217 may be connected, at connection point 250, such that they form a larger inductance compared with the inductance of the first coil 215 and the second coil 217.

Both coils 215 and 217 may be air coils, or wrapped around a ferrite core 210 as shown, or they can be in the form of a planar structure.

In the ferrite core 210 version, the coils 215 and 217 may be wrapped around the core 210 in an interleaved fashion, or wrapped on top of one another, i.e., the second coil 217 is first wrapped around the core 210, and then the first coil 215 is then wrapped around the core 210 on top of the second coil 217.

Connection point 245 couples one end of the first coil 215 to a first feeding connection 235 and to the first plate of the small loaded dipole 225. Connection point 250 couples another end of the first coil 215 to one end of the second coil 217 and to a second feeding connection 240. Connection point 255 couples another end of the second coil 217 to the second plate 230 of the small loaded dipole 220.

Figure 2B:
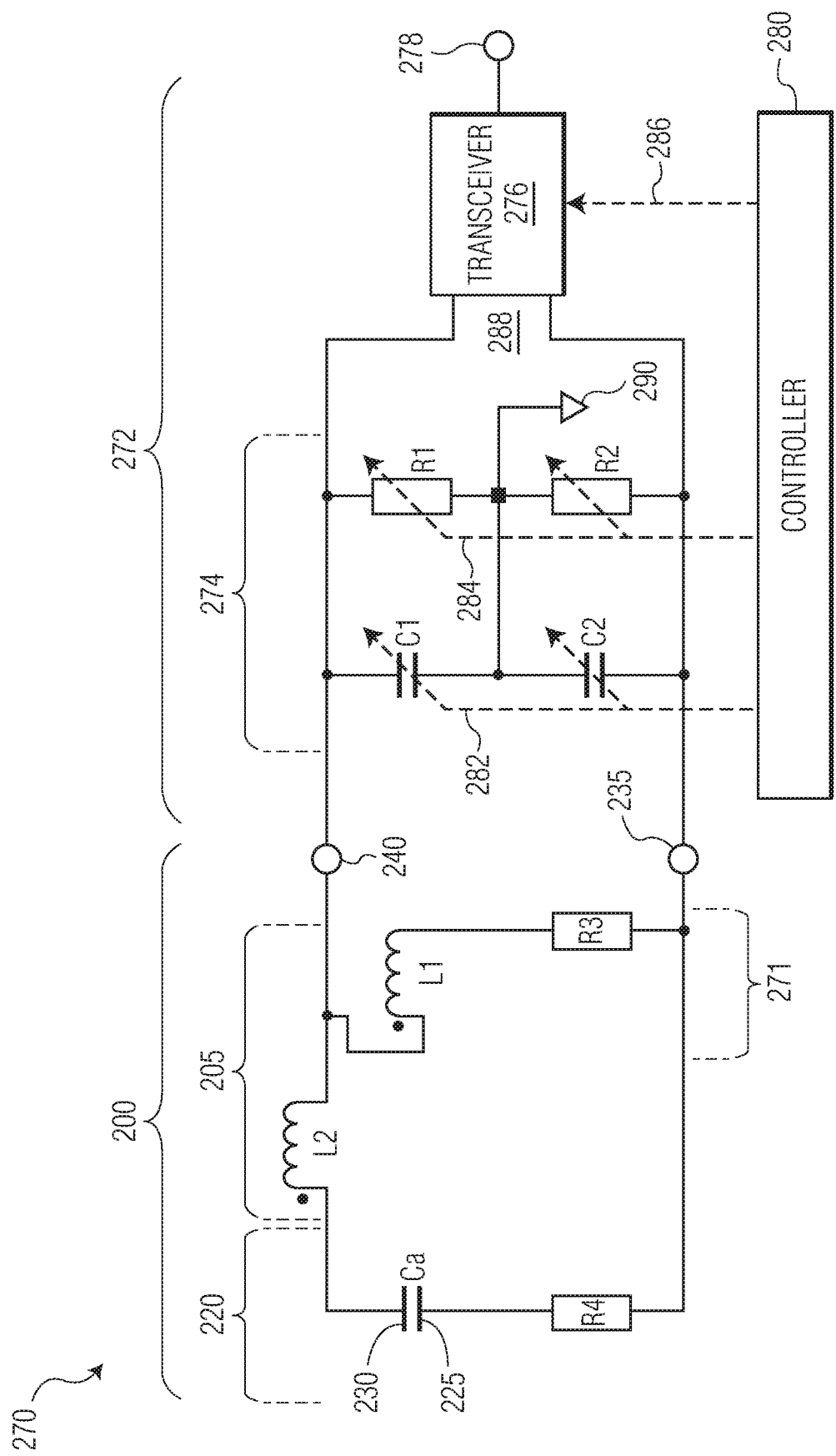
FIG. 2B is an example near-field device circuit including the near-field antenna, supporting circuits, and configured to receive non-propagating quasi-static near-field signals.

FIG. 2B is an example near-field circuit 270 based on the example near-field antenna architecture 200, supporting circuits 272, and configured to receive non-propagating quasi-static near-field signals. The near-field circuit 270 is configured to receive (e.g. in a receive mode) a non-propagating quasi-static near-field signal. Note that the near-field antenna 200 may also be coupled to a transmitter circuit (not shown) for two-way communications.

Coil 215 in the near-field antenna 200, having inductance (L1) and resistance (R3), forms a magnetic (H-field) antenna 271. The two loading plates 225 and 230 in the dipole portion 220 forms an electric (E-field) antenna 220. The two loading plates 225 and 230 are conductive structures. Coil 217 having inductance (L2) increases/boosts the electric antenna's 220 transmit voltage received from a transmitter power amplifier (not shown) coupled to the feeding connections 235, 240.

The supporting circuits 272 include a tuning circuit 274, a transceiver 276 (e.g. transceiver 112 in FIG. 1), a communications signal interface 278, and a controller 280. The supporting circuits 272 in other example embodiments include a user interface (not shown).

The tuning circuit 274 is coupled to the first and second feed points 235, 240. The tuning circuit 274 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 290 (e.g. a ground potential). The capacitive banks are coupled to the controller 280 by control line 282, and the resistance banks are coupled to the controller 280 by control line 284.

The controller 280 adjusts the first and second capacitance banks (C1), (C2) to adjust a resonant frequency of the magnetic 271 and the electric 220 antennas (e.g. to 10.6 MHz). The controller 280 adjusts the first and second resistance banks (R1), (R2) to adjust a bandwidth of the magnetic 271 and the electric 220 antennas (e.g. to 400 KHz) sufficient to allow the non-propagating quasi-static near-field signal to be received from the antennas 271, 220.

The capacitance banks (C1), (C2) are equally tuned using the control line 282 from the controller 280, and the resistance banks (R1), (R2) are equally tuned using the control line 284 from the controller 280.

The transceiver 276 is coupled between the tuning circuit 274 and the communications signal interface 278. When the near-field circuit 270 is communicating (i.e. receiving or transmitting) the non-propagating quasi-static near-field signal voltage 288 is present. The transceiver 276 is also coupled to the controller 108 by control line 286 which varies an insertion loss impedance as discussed earlier.

FIG. 3 is an example near-field channel path-loss 300. The channel path-loss 302 between a first near-field communications device and a second near-field communications device verses frequency 304 is shown. The frequency 304 is in MHz. and the channel path-loss 302 is in dB. The channel path-loss 302 is defined by:

$$P = \frac{V_{Rx}}{V_{Tx}} - G_{Tx} - G_{Rx}$$

Where:
P channel pathloss in dB
VRx Voltage at an LNA input of a receiver in the first near-field device;
VTx Voltage at a near-field antenna of a transmitter in second near-field device;
GTx Gain of the transmitter's antenna in dB
GRx Gain of the receiver's antenna in dB As shown, at lower frequencies 304 the pathloss 302 is increased and the communication range around the near-field devices is reduced. Thus for detecting a touch/contact condition a lower first center frequency can be selected (e.g. below 1 MHz) than the second center frequency. The second center frequency is selected higher (e.g. above 10 MHz) and used for data communication with higher data rate.

In some example embodiments, the lower first center frequency is chosen such that there is no initial near-field communication when the two near-field devices are 1 or 2 meters apart (e.g. prior to or during game-play), and the higher second center frequency is chosen such that there is near-field communication when the two near-field devices are 1 or 2 meters apart (e.g. prior to or during game-play).

Figure 4:
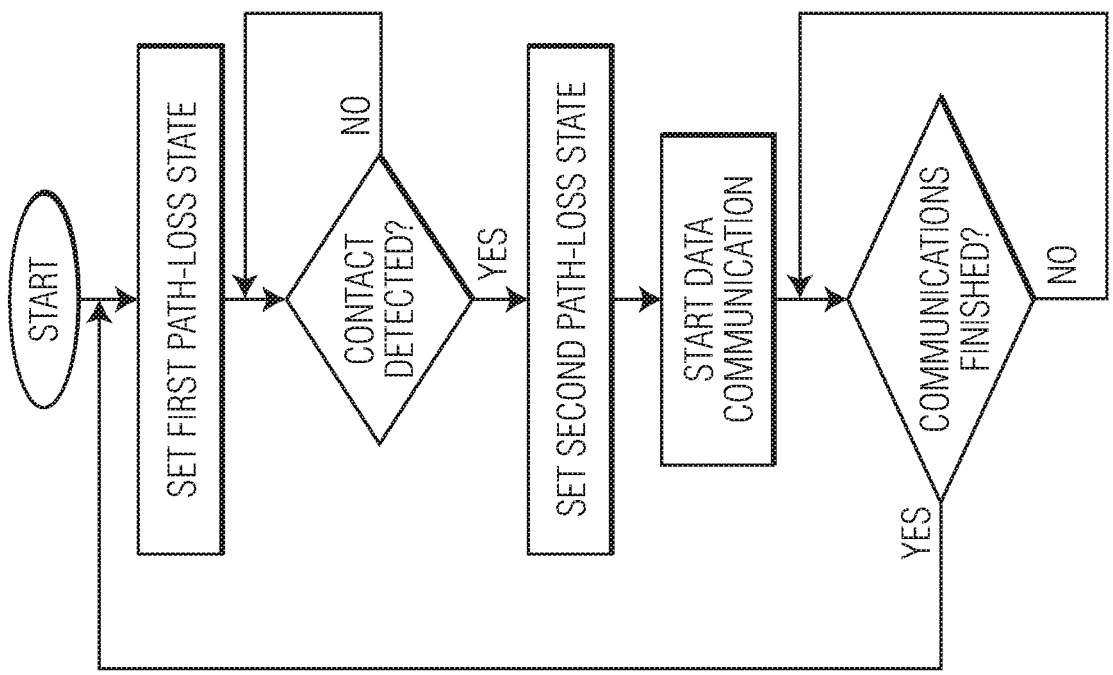
FIG. 4 is an example state diagram for operating the near-field wireless device.

FIG. 4 is an example state diagram 400 for operating the near-field wireless device 100. At the start, the device 100 is placed in to a first path-loss state having a higher path-loss that enable contact detection but prevents data communications.

Then upon contact being detected, the device 100 is placed in to a second path-loss state having a lower path-loss so that data communications can be started.

Applications/implementations of the near-field wireless device 100 include various wearable and gaming applications.

For wearable and/or medical applications, two users can signal permission for data communications by touching or coming within a predetermined contact detected range.

For gaming applications, two users can signal permission for data communications by enabling contact to be detected at a start of game play (e.g. to switch players or change levels) and/or during game play (e.g. a "high-five" to exchange scoring information).

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A first near-field device, comprising:
a near-field antenna;
a tuning circuit;
a transceiver circuit coupled to the near-field antenna and tuning circuit;
a controller coupled to the tuning circuit and the transceiver circuit;
wherein the first near-field device is configured to have an adjustable near-field communications channel path-loss with respect to a second near-field device;
wherein the path-loss sets a maximum distance between the first near-field device and the second near-field device within which the first near-field device and the second near-field device can exchange data;
wherein the controller is configured to set the path-loss to a first channel path-loss before the first and second near-field devices come within a predefined threshold distance;
wherein the first channel path-loss enables the first near-field device and the second near-field device to exchange data only within the predefined threshold distance;
wherein the controller is configured to set the path-loss to a second channel path-loss automatically after the first and second near-field devices have come within the predefined threshold distance;
wherein the second channel path-loss enables the first near-field device and the second near-field device to exchange data beyond the predefined threshold distance; and
wherein the first path-loss is greater than the second path-loss.

2. The device of claim 1:
wherein the first channel path-loss blocks data transfer between the first and second devices; and
wherein the second channel path-loss enables data transfer between the first and second devices.

3. The device of claim 1:
wherein the controller is configured to set an impedance of the near-field device to a first impedance and a second impedance;
wherein, to set the first channel path-loss, the controller is configured to set the impedance to the first impedance; and
wherein, to set the second channel path-loss, the controller is configured to set the impedance to the second impedance.

4. The device of claim 3:
wherein the first impedance is greater than the second impedance.

5. The device of claim 1:
wherein the controller is configured to set a power level of the near-field device to a first power level and a second power level;
wherein, to set a first channel field strength, the controller is configured to set the power level to the first power level; and
wherein, to set a second channel field strength, the controller is configured to set the power level to the second power level.

6. The device of claim 5:
wherein the first power level is less than the second power level.

7. The device of claim 1:
wherein the controller is configured to set a center frequency of the near-field antenna to a first center frequency and a second center frequency;
wherein, to set the first channel path-loss, the controller is configured to command the tuning circuit to set the near-field antenna to the first center frequency; and
wherein, to set the second channel path-loss, the controller is configured to command the tuning circuit to set the near-field antenna to the second center frequency.

8. The device of claim 7:
wherein the second center frequency is greater than the first center frequency.

9. The device of claim 7:
wherein the center frequency is a resonant center frequency.

10. The device of claim 7:
wherein the tuning circuit is configured to change the center frequency in response to a command from the controller to change a capacitive tuning parameter in the tuning circuit.

11. The device of claim 7:
wherein a first frequency band is defined by the first center frequency and a second frequency band is defined by the second center frequency; and
wherein the controller is configured to adapt the first and second center frequencies to a change in either resonance frequency or bandwidth due to electromagnetic loading within each of the first and second frequency bands.

12. The device of claim 1:
wherein the controller is configured to set a bandwidth of the near-field antenna to a first bandwidth and a second bandwidth;
wherein, to set the first channel path-loss, the controller is configured to command the tuning circuit to set the near-field antenna to the first bandwidth; and
wherein, to set the second channel path-loss, the controller is configured to command the tuning circuit to set the near-field antenna to the second bandwidth.

13. The device of claim 12:
wherein the second bandwidth is narrower than the first bandwidth.

14. The device of claim 12:
wherein the tuning circuit is configured to change the bandwidth in response to a command from the controller to change a resistive tuning parameter in the tuning circuit.

15. The device of claim 1:
further comprising a contact detector circuit;
wherein the contact detector circuit is configured to output a second near-field device is within the predefined threshold distance signal in response to a change in a parameter of the tuning circuit; and
wherein the parameter is based on a capacitive and/or resistive tuning parameter configured to maintain a center frequency and/or bandwidth of the near-field device.

16. The device of claim 1:
further comprising a contact detector circuit; and
wherein the contact detector circuit is configured to output a second near-field device is within the predefined threshold distance signal in response to a change in a near-field communications signal voltage between the transceiver circuit and the tuning circuit.

17. The device of claim 1:
further comprising a contact detector circuit;
wherein the contact detector circuit is configured to output a second near-field device is within the predefined threshold distance signal in response to actual physical contact between the first near-field device and the second near-field device.

18. The device of claim 1:
further comprising a contact detector circuit;
wherein the contact detector circuit is configured to output a second near-field device is within the predefined threshold distance signal in response to the first near-field device and the second near-field device coming within the predefined threshold distance.

19. The device of claim 1:
wherein the near-field antenna includes,
an H-field antenna configured to receive a non-propagating quasi-static magnetic near-field signal; and
an E-field antenna is configured to receive a non-propagating quasi-static electric near-field signal from the conductive structure; and
wherein a conductive surface of the near-field antenna is configured to be coupled to an on-body surface by the non-propagating quasi-static near-field electric-induction signals.

* * * * *